(12) United States Patent
Teruyama

(10) Patent No.: US 9,973,479 B2
(45) Date of Patent: May 15, 2018

(54) COMMUNICATION SYSTEM AND COMMUNICATION METHOD FOR COMMUNICATION BASED ON ENCRYPTION CAPABILITIES OF DEVICE

(71) Applicant: Sony Corporation, Tokyo (JP)

(72) Inventor: Katsuyuki Teruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/073,255

(22) Filed: Mar. 17, 2016

(65) Prior Publication Data

US 2016/0197892 A1    Jul. 7, 2016

Related U.S. Application Data

(63) Continuation of application No. 14/341,166, filed on Jul. 25, 2014, now Pat. No. 9,325,673, which is a
(Continued)

(30) Foreign Application Priority Data

Sep. 5, 2006   (JP) ................................ 2006-240065

(51) Int. Cl.
    *H04L 29/06*     (2006.01)
    *H04L 9/08*      (2006.01)
    (Continued)

(52) U.S. Cl.
    CPC ........ *H04L 63/0428* (2013.01); *H04L 9/0618* (2013.01); *H04L 9/0841* (2013.01);
    (Continued)

(58) Field of Classification Search
    CPC ..... H04L 63/0428; H04L 9/0618; H04L 9/14; H04L 9/0841; H04L 63/205;
    (Continued)

(56) References Cited

U.S. PATENT DOCUMENTS

| | | | | |
|---|---|---|---|---|
| 4,652,990 A | * | 3/1987 | Pailen | .................. G06F 21/123 |
| | | | | 380/46 |
| 5,081,678 A | * | 1/1992 | Kaufman | .............. H04L 9/0822 |
| | | | | 380/284 |

(Continued)

FOREIGN PATENT DOCUMENTS

| CN | 1469580 A | 1/2004 |
|---|---|---|
| CN | 1503504 A | 6/2004 |

(Continued)

OTHER PUBLICATIONS

Dierks T. et al., "The TLS Protocol Version 1.0", Request for Comments: 2246, pp. 1-80, (1999).

(Continued)

*Primary Examiner* — David Garcia Cervetti
(74) *Attorney, Agent, or Firm* — Chip Law Group

(57) ABSTRACT

The present embodiments relate to a communication system, communication method, information processor, method, device, program, and recording medium which permit plural algorithms to be treated and which can impart expansibility to communications.

A capability list stores a capability list in which capabilities regarding algorithms for encryption and decryption treated by a reader/writer are described. Similarly, a capability list stores a capability list in which capabilities regarding algorithms for encryption and decryption treated by an IC card are described. The reader/writer and the IC card exchange their mutual capability lists, select algorithms capable of securing a security level according to the importance of the data sent and received, and perform communications based on the selected algorithms. The present embodiments can be applied, for example, to a device that performs communications by the NFCIP method.

15 Claims, 15 Drawing Sheets

Related U.S. Application Data continuation of application No. 12/090,878, filed as application No. PCT/JP2007/067256 on Sep. 5, 2007, now Pat. No. 8,811,613.

(51) Int. Cl.
*H04L 9/14* (2006.01)
*H04W 12/04* (2009.01)
*H04L 9/06* (2006.01)
*H04W 84/12* (2009.01)
*H04W 84/18* (2009.01)

(52) U.S. Cl.
CPC .............. *H04L 9/14* (2013.01); *H04W 12/04* (2013.01); *H04L 63/205* (2013.01); *H04L 2209/805* (2013.01); *H04W 84/12* (2013.01); *H04W 84/18* (2013.01)

(58) Field of Classification Search
CPC .................. H04L 2209/805; H04W 12/04; H04W 84/12; H04W 84/18
See application file for complete search history.

(56) References Cited

U.S. PATENT DOCUMENTS

| | | | | |
|---|---|---|---|---|
| 5,371,794 A * | 12/1994 | Diffie | .................... | H04L 9/0844 380/273 |
| 5,651,068 A * | 7/1997 | Klemba | ................ | G06F 21/602 235/380 |
| 6,094,485 A * | 7/2000 | Weinstein | ............. | H04L 63/105 380/30 |
| 6,125,186 A * | 9/2000 | Saito | ........................ | H04L 29/06 380/260 |
| 6,134,662 A * | 10/2000 | Levy | ..................... | G06F 21/606 713/160 |
| RE36,946 E * | 11/2000 | Diffie | .................... | H04L 9/0844 380/273 |
| 6,212,633 B1 * | 4/2001 | Levy | ................. | H04L 12/40104 380/283 |
| 6,704,871 B1 * | 3/2004 | Kaplan | ................... | G06F 21/72 713/192 |
| 6,708,273 B1 * | 3/2004 | Ober | ........................ | G06F 8/60 713/189 |
| 6,931,532 B1 * | 8/2005 | Davis | .................. | G06F 21/6209 380/273 |
| 6,941,459 B1 * | 9/2005 | Hind | ................... | G06F 17/227 380/273 |
| 6,961,849 B1 * | 11/2005 | Davis | .................. | G06F 21/6227 380/273 |
| 7,146,505 B1 * | 12/2006 | Harada | ................ | G06Q 20/206 705/18 |
| 7,219,223 B1 * | 5/2007 | Bacchus | ............. | H04L 63/0428 713/150 |
| 7,231,517 B1 * | 6/2007 | Mashayekhi | ......... | H04L 63/045 709/229 |
| 7,237,124 B2 | 6/2007 | Kuroiwa et al. | | |
| 7,263,192 B2 * | 8/2007 | Morlang | ............. | H04L 63/0428 380/277 |
| 7,382,882 B1 * | 6/2008 | Immonen | ............ | H04L 63/0428 380/247 |
| 7,434,069 B2 * | 10/2008 | Nessler | ................. | G06F 21/575 380/255 |
| 7,660,417 B2 * | 2/2010 | Blom | .................. | H04L 63/0428 380/247 |
| 7,747,862 B2 * | 6/2010 | Ovadia | .................. | H04L 9/0877 713/176 |
| 8,112,794 B2 * | 2/2012 | Little | .................. | H04L 63/0853 380/270 |
| 8,127,130 B2 * | 2/2012 | Ellis | ..................... | H04L 9/0662 713/151 |
| 8,380,856 B1 * | 2/2013 | Nedderman | ........ | H04L 65/1069 370/356 |
| 8,417,946 B2 * | 4/2013 | Nguyen | ............... | G06F 21/6245 713/164 |
| 2002/0066011 A1 | 5/2002 | Vialen et al. | | |
| 2002/0169965 A1 * | 11/2002 | Hale | ........................ | H04L 9/32 713/182 |
| 2003/0059053 A1 * | 3/2003 | Medvinsky | ............. | G06F 21/10 380/277 |
| 2003/0063750 A1 * | 4/2003 | Medvinsky | ............. | G06F 21/10 380/277 |
| 2003/0065917 A1 * | 4/2003 | Medvinsky | ............. | G06F 21/10 713/160 |
| 2003/0070068 A1 * | 4/2003 | Medvinsky | ........ | G06Q 20/3678 713/155 |
| 2003/0093694 A1 * | 5/2003 | Medvinsky | .......... | G06Q 20/367 726/6 |
| 2003/0140239 A1 | 7/2003 | Kuroiwa et al. | | |
| 2003/0149871 A1 * | 8/2003 | Medvinsky | ......... | H04L 63/0807 713/155 |
| 2003/0149880 A1 * | 8/2003 | Shamsaasef | .......... | H04L 63/062 713/182 |
| 2003/0163693 A1 * | 8/2003 | Medvinsky | ......... | H04L 63/0807 713/169 |
| 2003/0182576 A1 * | 9/2003 | Morlang | ............. | H04L 63/0428 713/171 |
| 2003/0221099 A1 * | 11/2003 | Medvinsky | ......... | H04L 63/0807 713/153 |
| 2003/0226017 A1 * | 12/2003 | Palekar | ............... | H04L 63/0428 713/168 |
| 2004/0030896 A1 | 2/2004 | Sakamura et al. | | |
| 2004/0059913 A1 * | 3/2004 | de Jong | ................ | G06F 21/10 713/165 |
| 2004/0136533 A1 * | 7/2004 | Takagaki | ............ | H04L 9/0891 380/255 |
| 2005/0050316 A1 * | 3/2005 | Peles | .................... | H04L 63/0428 713/151 |
| 2005/0063002 A1 * | 3/2005 | Sugahara | ............... | G06F 21/608 358/1.15 |
| 2005/0204038 A1 * | 9/2005 | Medvinsky | ............. | G06F 21/10 709/225 |
| 2005/0216736 A1 * | 9/2005 | Smith | .................... | H04L 63/166 713/168 |
| 2005/0289347 A1 * | 12/2005 | Ovadia | ................. | H04L 9/0877 713/171 |
| 2006/0126836 A1 | 6/2006 | Rivas | | |
| 2006/0242405 A1 * | 10/2006 | Gupta | ................. | H04L 63/0823 713/156 |
| 2006/0294366 A1 * | 12/2006 | Nadalin | ................ | H04L 63/061 713/156 |
| 2007/0025341 A1 * | 2/2007 | Baigal | ................. | H04L 41/0213 370/352 |
| 2007/0124471 A1 * | 5/2007 | Harada | ................ | G06Q 20/206 709/225 |
| 2007/0157020 A1 * | 7/2007 | Lee | ........................ | H04L 63/061 713/155 |
| 2007/0157026 A1 * | 7/2007 | Zimmermann | ........ | H04L 9/0844 713/171 |
| 2007/0180237 A1 * | 8/2007 | Grieco | ................ | H04L 63/0428 713/163 |
| 2007/0245148 A1 * | 10/2007 | Buer | ..................... | H04L 9/3271 713/182 |
| 2007/0251997 A1 * | 11/2007 | Brown | ................. | G06K 7/0008 235/380 |
| 2008/0010688 A1 * | 1/2008 | Cai | ........................ | H04L 63/20 726/28 |
| 2008/0011827 A1 * | 1/2008 | Little | .................... | H04W 12/06 235/380 |
| 2008/0016368 A1 * | 1/2008 | Adams | ................ | H04L 63/0853 713/183 |
| 2008/0016537 A1 * | 1/2008 | Little | .................... | H04L 63/0853 725/81 |
| 2008/0022124 A1 * | 1/2008 | Zimmer | ................ | G06F 21/602 713/189 |

(56) References Cited

U.S. PATENT DOCUMENTS

| | | | | |
|---|---|---|---|---|
| 2008/0109650 A1* | 5/2008 | Shim | ............ | H04L 63/166 713/151 |
| 2013/0061039 A1* | 3/2013 | Ellis | ............ | H04L 9/0662 713/151 |

FOREIGN PATENT DOCUMENTS

| | | |
|---|---|---|
| JP | 7-336328 | 12/1995 |
| JP | 2000-278260 | 10/2000 |
| JP | 2002-152307 | 5/2002 |
| JP | 2004-15667 | 1/2004 |
| JP | 2004-015667 A | 1/2004 |
| JP | 2004-254286 | 9/2004 |
| JP | 2006-14076 | 1/2006 |
| WO | 2005/025176 A2 | 3/2005 |
| WO | 2005/067199 A1 | 7/2005 |
| WO | 2005/101787 A1 | 10/2005 |

OTHER PUBLICATIONS

Extended European Search Report of EP Patent Application No. 07806711.3, dated Apr. 28, 2017, 6 pages.

Office Action for CN Patent Application No. 201410465047.5, dated Sep. 26, 2017, 8 pages of Office Action.

"Information technology-Telecommunications and information exchange between systems-Local and metropolitan area networks—Specific requirements—PartII: Wireless LAN Medium Access Control (MAC) and Physical Layer (PHY) Specifications", 433 pages.

Office Action for CN Patent Application No. 201410465047.5, dated Feb. 4, 2017, 9 pages of Office Action and 18 pages of English Translation.

"Information technology—Telecommunications and information exchange between systems-Local and metropolitan area networks-Specific requirements—Part 11: Wireless LAN Medium Access Control (MAC) and Physical Layer (PHY) Specifications", GB 15629.112003, May 12, 2003, 433 pages.

Dierks, et al., "The TLS Protocol Version 1.0", Network Working Group Request for Comments: 2246, 1999, pp. 1-80.

Office Action for CN Patent Application No. 201410465047.5, dated Sep. 26, 2017, 8 pages of Office Action and 17 pages of English Translation.

Office Action for CN Patent Application No. 200780001293.3, dated Nov. 12, 2010, 6 pages of Office Action and 10 pages of English Translation.

* cited by examiner

FIG. 5

102 — CAPABILITY LIST STORAGE PORTION

KEY SHARING SYSTEM (K)

| K-0 | DH 768bit | K-4 | ECDH 160bit | K-8 | RSA 1024bit | K-C | Pre-shared key |
|---|---|---|---|---|---|---|---|
| K-1 | DH 1024bit | K-5 | ECDH 196bit | K-9 | RSA 2048bit | K-D | |
| K-2 | | K-6 | | K-A | | K-E | |
| K-3 | | K-7 | | K-B | | K-F | |

CRYPTOCOMMUNICATION SYSTEM (C)

| C-0 | DES 56bit | C-4 | AES 128bit | C-8 | | C-C | |
|---|---|---|---|---|---|---|---|
| C-1 | 3DES 112bit | C-5 | AES 192bit | C-9 | | C-D | |
| C-2 | 3DES 168bit | C-6 | AES 256bit | C-A | | C-E | |
| C-3 | | C-7 | | C-B | | C-F | |

FIG. 6

| KEY SHARING SYSTEM (K) | | | | | | | | | | | | | | | | | CRYPTOCOMMUNICATION SYSTEM (C) | | | | | | | | | | | | | | | | |
|---|---|---|---|---|---|---|---|---|---|---|---|---|---|---|---|---|---|---|---|---|---|---|---|---|---|---|---|---|---|---|---|---|
| K-F | K-E | K-D | K-C | K-B | K-A | K-9 | K-8 | K-7 | K-6 | K-5 | K-4 | K-3 | K-2 | K-1 | K-0 | C-F | C-E | C-D | C-C | C-B | C-A | C-9 | C-8 | C-7 | C-6 | C-5 | C-4 | C-3 | C-2 | C-1 | C-0 |

FIG. 12

CAPABILITY LIST STORAGE PORTION 102

KEY SHARING SYSTEM (K)

| K-0 | DH 768bit | K-4 | ECDH 160bit | K-8 | | K-C | |
|---|---|---|---|---|---|---|---|
| K-1 | | K-5 | | K-9 | | K-D | |
| K-2 | | K-6 | | K-A | | K-E | |
| K-3 | | K-7 | | K-B | | K-F | |

CRYPTOCOMMUNICATION SYSTEM (C)

| C-0 | DES 56bit | C-4 | AES 128bit | C-8 | | C-C | |
|---|---|---|---|---|---|---|---|
| C-1 | | C-5 | | C-9 | | C-D | |
| C-2 | | C-6 | | C-A | | C-E | |
| C-3 | | C-7 | | C-B | | C-F | |

FIG. 13

| KEY SHARING SYSTEM (K) | | | | | | | | | | | | | | | | CRYPTOCOMMUNICATION SYSTEM (C) | | | | | | | | | | | | | | | |
|---|---|---|---|---|---|---|---|---|---|---|---|---|---|---|---|---|---|---|---|---|---|---|---|---|---|---|---|---|---|---|---|
| K-F | K-E | K-D | K-C | K-B | K-A | K-9 | K-8 | K-7 | K-6 | K-5 | K-4 | K-3 | K-2 | K-1 | K-0 | C-F | C-E | C-D | C-C | C-B | C-A | C-9 | C-8 | C-7 | C-6 | C-5 | C-4 | C-3 | C-2 | C-1 | C-0 |
| 0 | 0 | 0 | 0 | 0 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 1 | 0 | 0 | 0 | 1 |

FIG. 14

202 — CAPABILITY LIST STORAGE PORTION

| KEY SHARING SYSTEM (K) | | | | | |
|---|---|---|---|---|---|
| K-0 | DH 768bit | K-4 | K-8 | K-C | |
| K-1 | DH 1024bit | K-5 | K-9 | K-D | |
| K-2 | | K-6 | K-A | K-E | |
| K-3 | | K-7 | K-B | K-F | |

| CRYPTOCOMMUNICATION SYSTEM (C) | | | | | |
|---|---|---|---|---|---|
| C-0 | | C-4 | AES 128bit | C-8 | C-C |
| C-1 | | C-5 | | C-9 | C-D |
| C-2 | | C-6 | | C-A | C-E |
| C-3 | | C-7 | | C-B | C-F |

FIG. 15

| KEY SHARING SYSTEM (K) | | | | | | | | | | | | | | | | | CRYPTOCOMMUNICATION SYSTEM (C) | | | | | | | | | | | | | | | |
|---|---|---|---|---|---|---|---|---|---|---|---|---|---|---|---|---|---|---|---|---|---|---|---|---|---|---|---|---|---|---|---|
| K-F | K-E | K-D | K-C | K-B | K-A | K-9 | K-8 | K-7 | K-6 | K-5 | K-4 | K-3 | K-2 | K-1 | K-0 | C-F | C-E | C-D | C-C | C-B | C-A | C-9 | C-8 | C-7 | C-6 | C-5 | C-4 | C-3 | C-2 | C-1 | C-0 |
| 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 1 | 1 |

COMMUNICATION SYSTEM AND COMMUNICATION METHOD FOR COMMUNICATION BASED ON ENCRYPTION CAPABILITIES OF DEVICE

CROSS-REFERENCE TO RELATED APPLICATIONS

This application is a continuation application of, and claims the benefit of priority under 35 U.S.C. § 120 from, U.S. Pat. No. 9,325,673 filed Jul. 25, 2014, which is a continuation application of, and claims the benefit of priority under 35 U.S.C. § 120 from, U.S. Pat. No. 8,811,613 filed Apr. 21, 2008, herein incorporated by reference, which is a National Stage Application of International Application No. PCT/JP07/67256, filed Sep. 5, 2007, and claims the benefit of priority from prior Japanese Patent Application JP 2006-240065, filed Sep. 5, 2006, the entire content of which is herein incorporated by reference.

TECHNICAL FIELD

The present invention relates to communication system, communication method, information processor, information processing method, device, program, and recording medium and, more particularly, to communication system, communication method, information processor, information processing method, device, program, and recording medium which enable communications to be performed taking account of mutual communication capabilities and so on when secure and convenient information communications are performed.

BACKGROUND ART

As the information technology has evolved, communication systems in which information processors such as computers are connected by WLANs (wireless local area networks), Bluetooth™, or other wireless communication means to send and receive files, data, and other information and share information have been built.

Motion picture data, music data, and other large-capacity data are sent and received by utilizing a device which is equipped with broadband communication functions such as a communication device capable of broadband communications using Bluetooth or the like, the communication device being installed in a cell phone or personal computer. Meanwhile, in data communications relying on broadband communications, encryption processing for encrypting data is generally introduced to reduce the danger of eavesdropping of data by a third-party's device equipped with broadband communication functions, forgery of data, and other security dangers even in broadband communications.

However, in order to execute encryption processing in broadband communications typified by Bluetooth, it is first necessary to identify the communicating party. Because communicable areas of broadband communications are wide, there is the possibility that an unexpected device equipped with broadband communication functions is identified as the communicating party.

Even if the communicating party is identified, it is necessary to share session keys for starting a more secure communication between both communicating parties. Because of the characteristics that the communicable areas of broadband communications are wide, when session keys are sent to a communicating party, there is the possibility that the keys are eavesdropped and decrypted by a broadband communication function-equipped device used by a third party. Therefore, it is necessary to enhance the strength of the session keys (e.g., increase the key length). For this purpose, it has been necessary that the broadband communication function-equipped device have high processing capabilities.

Accordingly, it has been proposed to enable session keys to be shared securely between both communication devices (see, for example, patent reference 1).

Communications disclosed in patent reference 1 are now described briefly with reference to FIG. 1. Devices performing communications are herein referred to as an initiator and a target, respectively.

The initiator creates and sends a key in step S11. The initiator executes polling (processing for inquiry), for example. If a response to the polling is sent in from the target, the initiator receives the response and creates an encryption key and a decryption key. The initiator sends the created encryption key to the target.

In step 21, the target receives the encryption key. In step S22, the target generates random numbers. The generated random numbers are taken as a session key. The session key is encrypted using the received encryption key as a key. The encrypted session key is sent to the initiator.

In step S12, if the initiator receives the encrypted session key from the target, the initiator decrypts the key with a decryption key and derives the session key. In step S13, communications using the decrypted session key are started.

If the initiator receives the encrypted session key in this way, the initiator decrypts the encrypted session key with the already generated decryption key, thus obtaining the session key. In this way, the common session key is shared between the initiator and the target. Communications using the session key, e.g., communications in which data sent and received with the session key are encrypted, are performed.
Patent reference 1: JP-A-2006-14076

DISCLOSURE OF THE INVENTION

Problem that the Invention is to Solve

As disclosed in patent reference 1, secure communications can be performed if a session key is shared. Furthermore, more secure communications can be performed if the algorithm is changed, for example, by data sent and received. In addition, expansible communications can be performed.

In view of these circumstances, the present invention has been made and is intended to enable more secure communications and permit expansible communications.

Means for Solving the Problem

An information processing system of one aspect of the present invention is a communication system composed of an information processor and a device performing communications. The information processing system comprises: sending means sending a list indicating capabilities regarding encryption from one of the information processor and the device to the other; decision means determining an algorithm by which the other receiving the list sent by the sending means refers to the received list and can perform communications with the one with capabilities regarding encryption of its own; and communication means performing communications by the algorithm determined by the decision means.

A communication method for an information processing system of one aspect of the present invention is a communication method for a communication system composed of an information processor and a device performing communications. A list indicating capabilities regarding encryption is sent from one of the information processor and the device to the other. The other receiving the sent list refers to the received list, determines an algorithm by which communications with the one can be performed with capabilities regarding encryption of its own, and performs communications by the determined algorithm.

In information processing system and communication method of one aspect of the present invention, a list indicating capabilities regarding encryption is sent from at least one of devices performing communications to the other. The receiving side determines an algorithm used for communications. Communications are performed based on the determined algorithm.

An information processor of one aspect of the present invention is an information processor performing communications with a device and comprises: storage means storing a first capability list indicating capabilities regarding encryption; reception means for receiving a second capability list indicating capabilities regarding encryption of the device; decision means determining an algorithm by which communications are performed with the device by referring to the first capability list and the second capability list; and sending means sending identification information for identifying the algorithm determined by the decision means and a key or key material relying on the algorithm to the device.

It is possible that there is further provided list-sending means that selects an algorithm becoming a candidate when decision processing is performed by the decision means from the first capability list, creates a third capability list in which the selected algorithm is written, and sends the created list to the device.

The decision means can determine the algorithm according to a security level.

A method of information processing of one aspect of the present invention is a method of information processing for an information processor that performs communications with a device. The method includes the steps of: managing a first capability list indicating capabilities regarding encryption; controlling reception of a second capability list indicating capabilities regarding encryption of the device; referring to the first capability list, and the second capability list and determining an algorithm by which communications with the device are performed; and controlling sending of identification information for identifying the algorithm determined by processing of the determining step and a key or key material relying on the algorithm to the device.

A program of one aspect of the present invention is a program for a computer that controls an information processor performing communications with a device. The program includes the steps of: managing a first capability list indicating capabilities regarding encryption; controlling reception of a second capability list indicating capabilities regarding encryption of the device; referring to the first capability list and the second capability list and determining an algorithm by which communications with the device are performed; and controlling sending of identification information for identifying the algorithm determined by processing of the determining step and a key or key material relying on the algorithm to the device.

A program is recorded on a recording medium of one aspect of the present invention, the program acting to cause an information processor performing communications with a device to perform processing including the steps of: managing a first capability list indicating capabilities regarding encryption; controlling reception of a second capability list indicating capabilities regarding encryption of the device; referring to the first capability list and the second capability list and determining an algorithm by which communications with the device are performed; and controlling sending of identification information for identifying the algorithm determined by processing of the determining step and a key or key material relying on the algorithm to the device.

In the information processor, method of information processing, and program of one aspect of the present invention, an algorithm by which communications are performed is determined from capabilities regarding encryption of a remote communicating party and from capabilities regarding encryption of the local party, and communications are carried out based on the determined algorithm.

A device of one aspect of the present invention is a device performing communications with an information processor and comprises: sending means sending a capability list indicating capabilities regarding encryption to the information processor; reception means receiving identification information for identifying an algorithm which is used when data is sent and received and which is determined by the information processor; and encryption-decryption means identifying the algorithm from the identification information and encrypting or decrypting by the identified algorithm.

It is possible that there is further provided second reception means receiving a second capability list indicating capabilities regarding encryption of the information processor. Capabilities that can be treated by the processor itself and are selected from the capabilities described in the second capability list are described in the capability list sent by the sending means.

A method of information processing of one aspect of the present invention is a method of information processing for a device performing communications with an information processor, and includes the steps of: controlling sending of a capability list indicating capabilities regarding encryption to the information processor; controlling reception of identification information for identifying an algorithm which is used when data is sent and received and which is determined by the information processor; and identifying the algorithm from the identification information and encrypting or decrypting data by the identified algorithm.

A program of one aspect of the present invention is a program for a computer that controls a device performing communications with an information processor, and includes the steps of: controlling sending of a capability list indicating capabilities regarding encryption to the information processor; controlling reception of identification information for identifying an algorithm which is used when data is sent and received and which is determined by the information processor; and identifying the algorithm from the identification information and encrypting or decrypting data by the identified algorithm.

A program is recorded on a recording medium of one aspect of the present invention, the program acting to cause a device performing communications with an information processor to perform processing including the steps of controlling sending of a capability list indicating capabilities regarding encryption to the information processor; controlling reception of identification information for identifying an algorithm which is determined by the information processor and which is used when data is sent and received; and identifying the algorithm from the identification information and encrypting or decrypting data by the identified algorithm.

In device, method of information processing, and program of one aspect of the present invention, a list indicating capabilities regarding encryption is sent. Information specifying an algorithm by which communications are performed is received. Encryption or decryption is performed based on the algorithm.

Advantages of the Invention

According to one aspect of the present invention, plural algorithms and methods of decryption can be selected. Furthermore, communications can be performed by the selected method.

BRIEF DESCRIPTION OF THE DRAWINGS

FIG. 5 is a diagram illustrating a capability list.

FIG. 6 is a diagram illustrating a capability list.

FIG. 12 is a diagram illustrating a capability list.
FIG. 13 is a diagram illustrating a capability list.
FIG. 14 is a diagram illustrating a capability list.
FIG. 15 is a diagram illustrating a capability list.

DESCRIPTION OF REFERENCE NUMERALS AND SIGNS

50: communication system; 100: reader/writer; 101: control portion; 102: capability list storage portion; 103: key creation portion; 104: data storage portion; 105: encryption portion; 106: decryption portion; 107: communication portion; 200: IC card; 201: control portion; 202: capability list storage portion; 203: random number creation portion; 204: data storage portion; 205: encryption portion; 206: decryption portion; 207: communication portion; 301: key creation portion

BEST MODE FOR CARRYING OUT THE INVENTION

Figure 1:
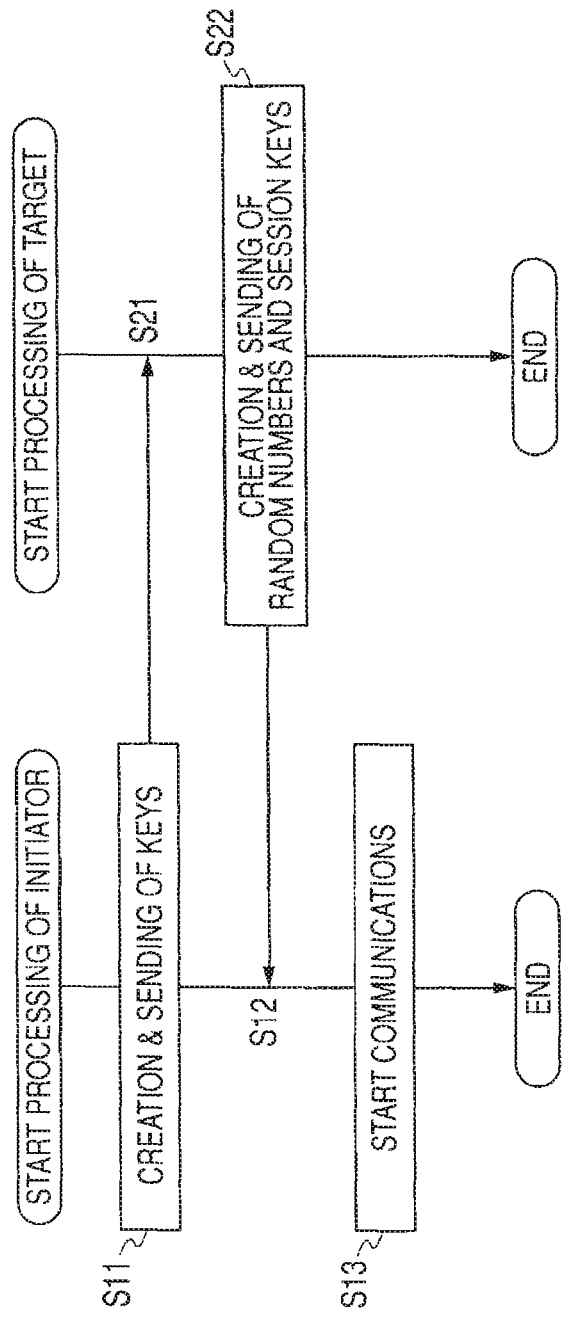
FIG. 1 is a flowchart illustrating one example of the prior-art communication system.
Figure 2:
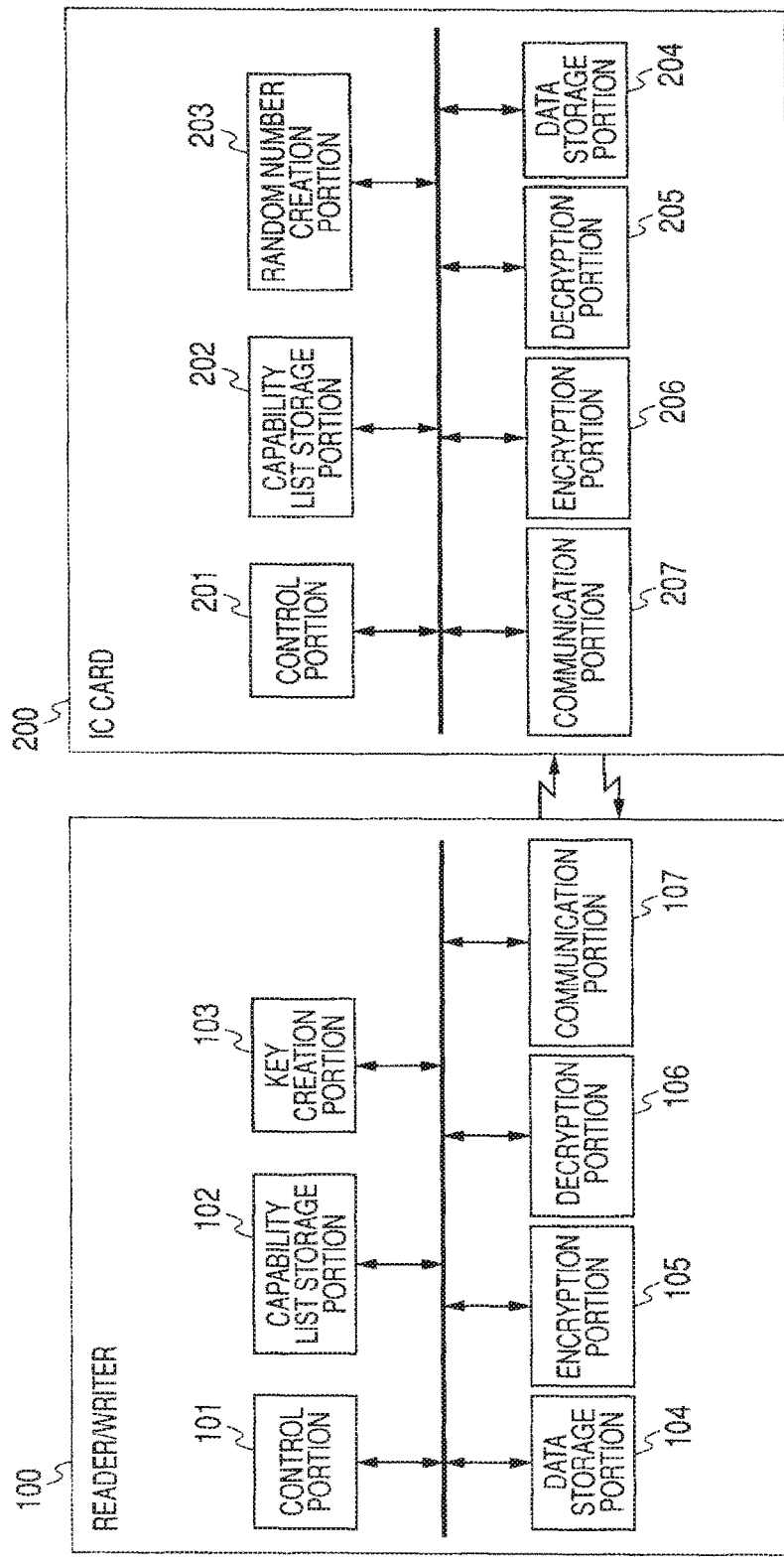
FIG. 2 is a diagram showing the configuration of one embodiment of a communication system of the present invention.

Embodiments of the present invention are hereinafter described with reference to the drawings.
[Example of Configuration of System]
FIG. 2 is a block diagram showing an example of configuration in one embodiment of a communication system 50 to which the present invention is applied. The communication system 50 is composed of a reader/writer 100 and an IC card 200. The reader/writer 100 and IC card 200 perform communications wirelessly, for example, via antennas or the like possessed by them.

The reader/writer 100 is configured including a control portion 101, a capability list storage portion 102, a key creation portion 103, a data storage portion 104, an encryption portion 105, a decryption portion 106, and a communication portion 107.

The control portion 101 is configured including a CPU (central processing unit), for example, and controls various portions of the reader/writer 100. The capability list storage portion 102 stores a list of capabilities regarding communications as described later, especially a list of capabilities regarding encryption methods and decryption methods (algorithms: in the present specification, the description "algorithm" may include a method and the lengths of keys for the method). The capability list stored in the capability list storage portion 102 is offered to the IC card 200 via the communication portion 107 as the need arises. The key creation portion 103 creates keys used for encryption and decryption.

The data storage portion 104 is configured including storage media, such as a RAM (random access memory) and a ROM (read only memory), and a recording medium. The data storage portion stores programs and data necessary for the control portion 101 to control various portions of the reader/writer 100. Furthermore, the data storage portion stores data from the IC card 200 and data offered to the IC card 200.

The encryption portion 105 encrypts a key and data supplied to the IC card 200. The decryption portion 106 decrypts the encrypted key and data from the IC card 200. Each of the encryption portion 105 and the decryption portion 106 performs encryption or decryption based on one of plural algorithms described in the capability list. Plural (more than 1) algorithms that can be treated by the device itself are described in the capability list. One of the plural described algorithms is selected (specified), and encryption or decryption is performed based on the selected (specified) algorithm.

The communication portion 107 performs communications with the IC card 200. The communication portion 107 of the reader/writer 100 is designed to radiate given electromagnetic waves and detect as to whether or not the IC card 200 has been brought close to the reader/writer, based on variations in the load responsive to the electromagnetic waves. For example, the communication portion is configured including an antenna (not shown) which, when the IC card 200 is brought close, various kinds of data are sent and received to and from the IC card 200.

The communication portion 107 ASK—(amplitude shift keying) modulates a carrier wave of a given frequency supplied, for example, from an oscillator circuit (OSC) based on data sent to the IC card 200 and outputs the generated modulated wave from the antenna as electromagnetic waves. Furthermore, the communication portion 107 demodulates the modulated wave (ASK modulated wave) derived via the antenna, and supplies the demodulated data to the control portion 101 and so on according to circumstances.

The IC card 200 is configured including a control portion 201, a capability list storage portion 202, a random number creation portion 203, a data storage portion 204, an encryption portion 205, a decryption portion 206, and a communication portion 207.

The control portion 201 is configured including a CPU, for example, and controls various portions of the IC card 200. The capability list storage portion 202 stores a list of capabilities regarding communications as described later, especially, capabilities regarding encryption methods and decryption methods (algorithms). The capability list stored in the capability list storage portion 202 is offered to the reader/writer 100 via the communication portion 207 as the need arises. The random number creation portion 203 generates random numbers. The generated random numbers are used as a session key in communications with the reader/writer 100 as described later.

The data storage portion 204 is configured including storage (recording) media such as RAM, ROM, and EEPROM (electrically erasable programmable read-only memory), and stores programs and data necessary for the control portion 201 to control various portions of the IC card 200. Furthermore, the data storage portion stores data from the reader/writer 100 and data offered to the reader/writer 100.

The encryption portion 205 encrypts keys and data supplied to the reader/writer 100. The decryption portion 206 decrypts the encrypted keys and data from the reader/writer 100. The encryption portion 205 and decryption portion 206 perform encryption and decryption based on one of plural algorithms described in the capability list. Plural (more than 1) algorithms that can be treated by the device itself are described in the capability list. One of the plural described algorithms is selected (specified), and encryption or decryption based on the selected (specified) algorithm is performed.

The communication portion 207 is configured including an LC circuit composed, for example, of a coil-like antenna and capacitors. The communication portion is designed to resonate with electromagnetic waves of a given frequency radiated from the reader/writer 100 disposed close to the LC circuit. Furthermore, the communication portion 207 rectifies an alternating magnetic field excited in the antenna by ASK modulation, stabilizes it, and supplies it as a DC power supply to various portions. The electric power of the electromagnetic waves radiated from the reader/writer 100 is so adjusted that a magnetic field that feeds a necessary electric power to the IC card 200 is produced.

Additionally, the communication portion 207 demodulates the modulated waves (ASK modulated waves) received via the antenna by performing an envelope detection, demodulates the demodulated data by BPSK (binary phase shift keying) demodulation, supplies the data to the control portion 201 and so on, generates a clock signal having the same frequency as the clock frequency of the signal signal, and supplies the generated signal to the control portion 201.

Furthermore, the communication portion. 207 ASK-modulates the BPSK-modulated data, for example, based on variations in the load on the antenna in a case where given information is sent to the reader/writer 100, and sends the modulation component to the reader/writer 100 via the antenna.

As described previously, the reader/writer 100 and IC card 200 perform communications wirelessly and so two or more IC card(s) or reader/writer(s) radiate out electromagnetic waves at the same time. As a result, there is the anxiety that it is impossible to discriminate whether the IC card or the reader/writer has emitted the electromagnetic waves (what object has emitted the electromagnetic waves), i.e., so-called collision. However, the reader/writer 100 and IC card 200 in the communication system 50 perform communications matched to NFCIP (near field communication-interface and protocol)-1 that is a communication method capable of identifying IC cards and RFIDs lying within the range in which they can communicate with the reader/writer.

NFCIP-1 incorporates mechanisms permitting RF detection and avoiding collision, in order to enable comparability of communications of other NFCIP-1 device with communications by other device communicating in the same band. An NFC device identifier known as NFC identifier (NFCID (NFC Identifier) is used when RF collision is avoided and used for processing for searching for a single device, the NFC device identifier utilizing random numbers. In conventional communication system, IDs intrinsic to the IC card are sent to the reader/writer and the reader/writer identifies each individual IC card based on the IDs, thus preventing collision. In NFCIP-1, it is not necessary to send the ID intrinsic to the IC card to the reader/writer.

Accordingly, in the communication system 50, the reader/writer 100 and IC card 200 can uniquely identify their respective communicating parties even if the card ID intrinsic to the IC card 200 is not sent to the reader/writer 100, whereby collision can be prevented.

Details of NFCIP-1 are described in ISO/IEC18092.

In the following description, a case in which the reader/writer 100 operates as an initiator stipulated in NFCIP-1, while the IC card 200 operates as a target stipulated in NFCIP-1 is taken as an example.

[With Respect to Operation of the System]

Figure 3:
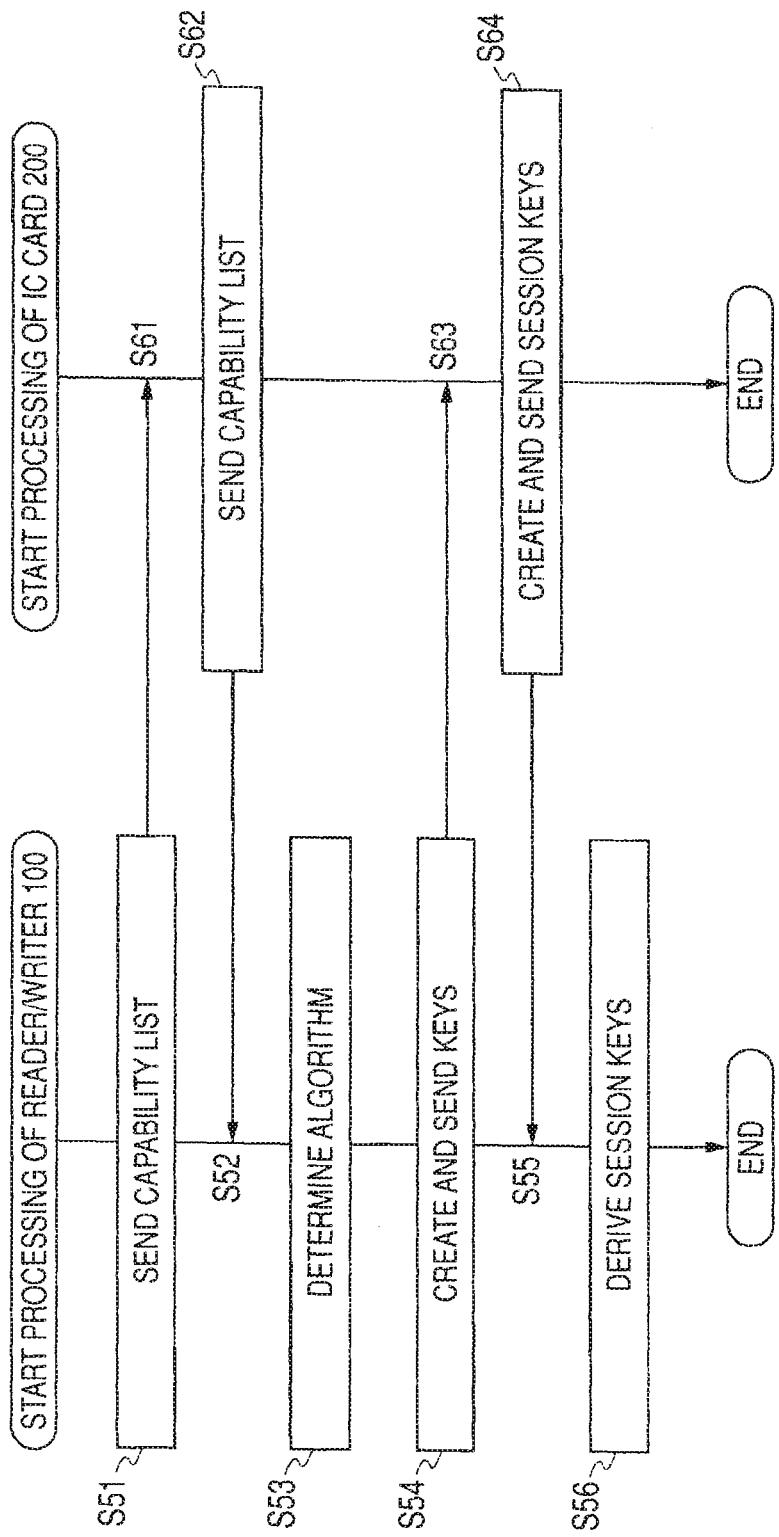
FIG. 3 is a flowchart illustrating the operation of the communication system.

The operation of the communication system 50 shown in FIG. 2 is next described by referring to the flowchart of FIG. 3. First, the operation of the communication system 50 is briefly described by referring to the flowchart of FIG. 3. Then, details of the operations of the reader/writer 100 and IC card 200 will be described.

The reader/writer 100 sends a capability list, to the IC card 200 in step S51. The sent capability list is received by the IC card 200 in step S61. If the IC card 200 receives the capability list from the reader/writer 100, the IC card sends the capability list of its own to the reader/writer 100 in step S62. The sent capability list is received by the reader/writer 100 in step S52.

In this way, the reader/writer 100 and IC card 200 exchange information about their mutual communication capabilities, in this case, information about algorithms associated with encryption and decryption.

The reader/writer 100 refers to its own capability list and the capability list of the IC card 200 in step S53, and selects algorithms described in the mutual lists, i.e., the algorithms used for encryption and decryption, out of the common algorithms.

In step S54, an encryption key and a decryption key are created based on the selected algorithms, and the encryption key out of the keys is sent to the IC card 200. In this description, a case is taken as an example in which an algorithm by which an encryption key and a decryption key axe created is selected. The created keys and the method of creating them are different according to the selected algorithm.

If the IC card 200 receives the encryption key from the reader/writer 100 in step S63, the IC card generates random numbers in step S64 and sets the generated random numbers as a session key. The session key is encrypted with the received encryption key and sent to the reader/writer 100.

If the reader/writer 100 receives the encrypted session key in step S55, the reader/writer decrypts the encrypted session key using the decryption key created in step S54.

In this way, the session key is shared between the reader/writer 100 and the IC card 200. After the session key is shared, communications using the session key are carried out according to circumstances.

Here, as described above, it is assumed that the session key is encrypted and sent, for example, in step S-step S64. Alternatively, a material for creating the session key may be sent instead of sending the session key itself.

That is, in the present embodiment, an encryption method is determined by exchanging capability lists as the description continues below. In some cases, the session key itself is sent and received based on the determined encryption method. In other cases, a material for creating the session key is sent and received. In further cases, information not associated with the session key is sent and received depending on the determined encryption method. The information sent and received depends on the determined encryption method.

Figure 4:
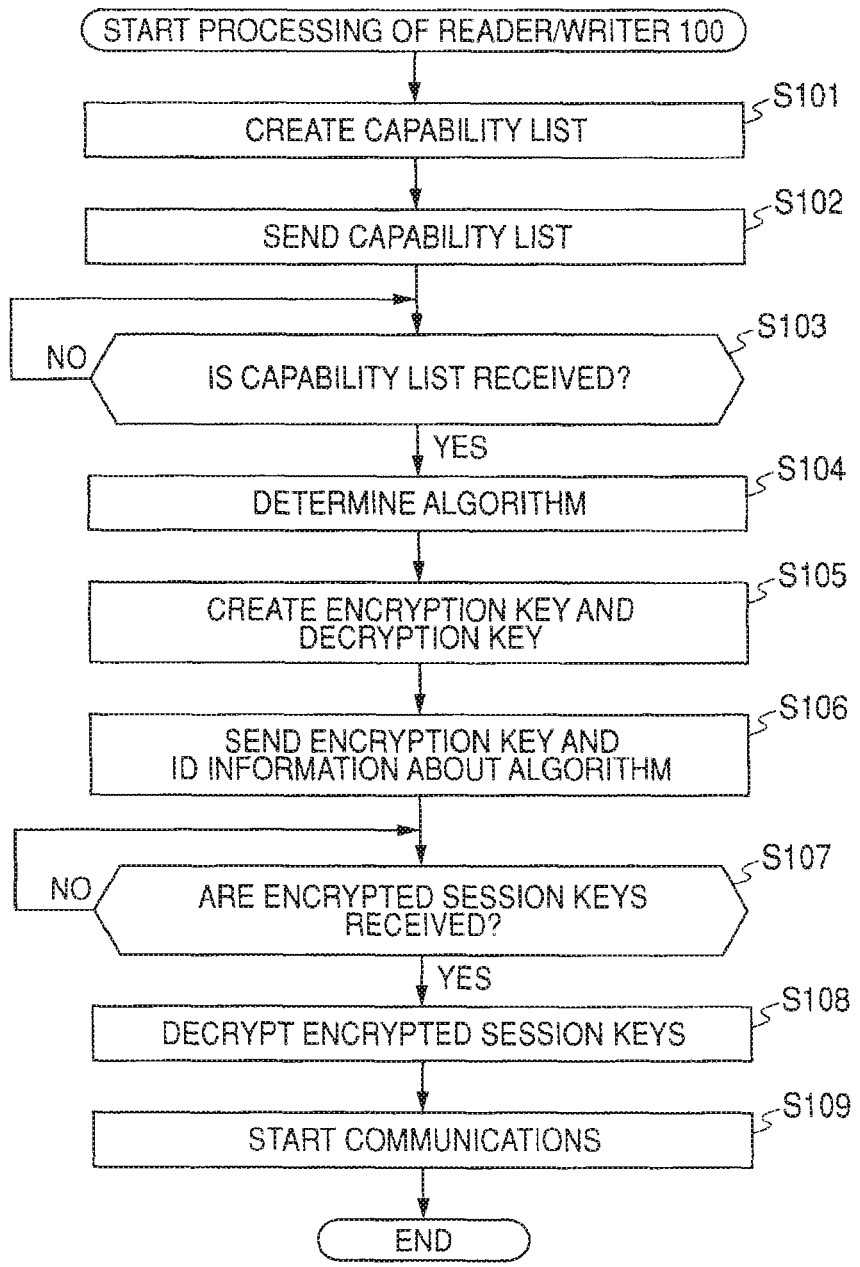
FIG. 4 is a flowchart illustrating the operation of a reader/writer.

The operation of the reader/writer 100 is next described in detail by referring to the flowchart of FIG. 4.

In step S101, the reader/writer 100 creates a capability list. The control portion 101 of the reader/writer 100 creates a capability list sent to the IC card 200 by referring to the capability list stored in the capability list storage portion 102. The created capability list is sent to the IC card 200 in step S102.

The relationship between the capability (hereinafter may be referred to as the first capability list according to circumstances) stored in the capability list storage portion 102 and the created capability list (hereinafter may be referred to as the second capability list according to circumstances) is now described by referring to FIGS. 5 and 6.

FIG. 5 is a diagram showing one example of capability list stored in the capability list storage portion 102. Algorithms associated with encryption and decryption are classified into two, i.e., key sharing system and cryptocommunication system. For convenience of illustration, in this description, capability lists are classified into two lists as shown in FIG. 5. Of course, one list form is also possible.

A list, in which 16 algorithms can be registered as key sharing systems and a list in which 16 algorithms can be registered as cryptocommunication systems are stored in the capability list storage portion 102. It is assumed here that sixteen algorithms can be registered in each list. This corresponds to the manner in which the second capability list sent to the IC card 200 is represented in terms of 16 bits as shown in FIG. 6. Therefore, if the second capability list is created with bit numbers other than 16 bits, algorithms corresponding in number with the number of bits can be stored as a first capability list.

The second capability list, shown in FIG. 6 shows one example in which 16 bits are assigned to the key sharing systems and 16 bits are assigned to the cryptocommunication systems. In FIGS. 5 and 6, the key sharing systems are indicated by K according to circumstances. The cryptocommunication systems are indicated by C according to circumstances.

In describing the relationship between the first capability list shown in FIG. 5 and the second capability list shown in FIG. 6, if the reader/writer 100 has the capability of handling the algorithm described in the column "K-0" of the first capability list, the bit of "K-0" of the key supply system of the second capability list shown in FIG. 6 is set to 1. The description is continued, assuming that the bit corresponding to a possessed capability is set to 1 and that the bit corresponding to a capability not possessed is set to 0. It is also possible that the bit corresponding to a possessed capability is set to 0 and that the bit corresponding to a capability not possessed is set to 1.

One algorithm is assigned to each column of the first capability list. For example, with reference to FIG. 5, an algorithm "DH 768 bit" that is a key sharing system is assigned to the column "K-0". Where the assigned algorithm can be handled, any form of information is written in the column. The information written in the column may be a flag indicating whether or not it can be handled. Information such as the name of the algorithm may also be possible.

In this way, a given column of the first capability list stored in the capability list storage portion 102 is made to correspond to a given algorithm. As shown in FIG. 5, each column corresponding to an algorithm not handled by the reader/writer 100 is made blank (no information is written, or information indicating that it has no capability of handling the corresponding algorithm is described).

Alternatively, the first capability list may be a list in which only information only about algorithms treated by the reader/writer 100, for example, is described in a manner not illustrated. For instance, according to the example shown in FIG. 5, a list consisting of information "K-0, K-1, K-4, K-5, K-8, K-9, K-C, C-0, C-1, C-2, C-4, C-5, C-6" is also possible.

Furthermore, such first capability list may be updatable. For example, in communications in the communication portion 107 (FIG. 2), data about a new algorithm may be sent and received, data about the algorithm sent and received may be stored in the data storage portion 104, and the first capability list stored in the capability list storage portion 102 may be updated (i.e., information is described in the column corresponding to the newly added algorithm). Algorithms described in the capability list can be deleted. Already described information may be overwritten.

The first capability list as shown in FIG. 5 may be referenced, and the second capability list shown in FIG. 6 may be created. That is, the second capability list may be created by setting bits, which correspond to the columns of the first capability list where information is described, to 1. Alternatively, in the second capability list shown in FIG. 6, the first capability list in which the bit of the treated algorithm is set to 1 may also be possible (i.e., the relationship "first capability list=second capability list" is satisfied and the capability list stored in the capability list storage portion 102 is read out and sent).

In FIG. 5, "DH" is an abbreviation of "Diffie-Hellman". "ECDH" is an abbreviation of "Elliptic Curve Diffie-Hellman". "RSA" is an abbreviation of "Rivest, Shamir, Adleman". "DES" is an abbreviation of "Data Encryption Standard". "AES" is an abbreviation of "Advanced Encryption Standard". "Pre-shared key" indicates a key sharing system relying on a pre-shared key.

We now return to the description of the flowchart of FIG. 4.

In steps S101, 102, capability lists are created and sent. The sent second capability list may be a list in which all the capabilities of the reader/writer 100 are described (it may be a second capability list in which all the information in the first capability list stored in the capability list storage portion 102 is reflected). It may also be a list in which some of the capabilities are described.

Where a capability list in which some capabilities are described is sent, a capability list in which only algorithms satisfying a required security level are described may be created and sent because of the importance of data sent and received, for example, in later processing. In other words, where a capability list in which some capabilities are described is sent, an algorithm used for communications is determined in later processing (specifically, in the processing of step S104). A capability list may be created and sent in which only algorithms becoming candidates when the determination is made are described.

In step S103, a decision is made as to whether any capability list has been received. If a capability list of the reader/writer 100 is sent from the reader/writer 100 to the IC card 200 (corresponding to the processing of step S51 of FIG. 3), a capability list of the IC card is sent in as a reply to it from the IC card 200 (corresponding to the processing of step S52 of FIG. 3).

A capability list is stored in the capability list storage portion 202 of the IC card 200 in the same way as the capability list storage portion 102 of the reader/writer 100. That is, the first capability list as shown in FIG. 5 is stored in the capability list storage portion 202 of the IC card 200. The second capability list as shown in FIG. 6 is sent to the reader/writer 100.

In step S103, if the control portion 101 of the reader/writer 100 has determined that the control portion has received a capability list from the IC card 200 by the communication portion 107, the control portion determines an algorithm in step S104. The control portion 101 refers to the received capability list of the IC card 200 and to the capability list stored in the capability list storage portion 102 and selects an algorithm that can be treated by both (i.e., an algorithm for which a flag is set in two capability lists is selected).

For example, where both the reader/writer 100 and IC card 200 store the capability list shown in FIG. 5, a flag is set in each of columns "K-0, K-1, K-4, K-5, K-8, K-9, K-C, C-0, C-1, C-2, C-4, C-5, C-6". Therefore, one algorithm is selected from the key-sharing systems (K) of "K-0, K-1, K-4, K-5, K-8, K-9, K-C", and one algorithm is selected from the cryptocommunication systems (C) of "C-0, C-1, C-2, C-4, C-5, C-6".

In this case, in the key-sharing systems (K), for example, algorithms corresponding to 7 columns "K-0, K-1, K-4, K-5, K-8, K-9, K-C" are selected as choices. Thus, conditions under which what algorithms are selected when plural choices are present may be set according to circumstances in design stages, taking account of the functions possessed by the reader/writer 100 and what kinds of data to be managed.

Furthermore, as an example, priority orders may be placed. An algorithm having a higher order may be selected according to the priority orders. Alternatively, as later processing, data is exchanged with the IC card 200, for example. Selection may be made based on the importance or the like of the data. That selection is made based on the importance or the like of data means that an algorithm that cannot be easily deciphered is selected when important data is sent and received. Generally, as the key becomes longer, it becomes more difficult to decipher. Therefore, where there are "K-0 (DH 768 bit)" and "K-1 (DH 1024 bit)" as choices, for example, the longer key "K-1 (DH 1024 bit)" is selected.

In this way, algorithms used for encryption and decryption are determined based on some condition or other.

In step S105, an encryption key and a decryption key are created based on the determined algorithm. The control portion 101 issues an instruction to the key creation portion 103 to create the keys based on the determined algorithm. On receiving the instruction, the key creation portion 103 creates the encryption key and decryption key based on the determined algorithm.

Depending on the determined algorithm, the encryption key and decryption key created by the key creation portion 103 are taken as a set of keys. A plaintext (data) encrypted with the created encryption key (hereinafter may be referred to as the public key according to circumstances) cannot be decrypted unless a set of created decryption keys (hereinafter may be referred to as secret keys according to circumstances) is available.

In step S106, the created encryption key is sent. The communication portion 107 sends the encryption key, which has been created by the key creation portion 103, to the IC card 200. Together with the encryption key, information (hereinafter may be referred to as identification information according to circumstances) for identifying the determined algorithm (algorithm used for creating the encryption key) is sent. A capability list which is in the capability list form, for example, as shown in FIG. 6 and in which only the bits of the determined algorithm are set can be used as the identification information.

When the encryption key is supplied to the IC card 200, the IC card 200 sends an encryption session key encrypted using the encryption key as a key (corresponding to the processing of step S64 of FIG. 3). The reader/writer 100 makes a decision as to whether it has received the encryption session key from the IC card 200 in step S107, and keeps waiting for reception until the reader/writer determines that it has received.

If the decision at step S107 is that the encryption session key has been received, the processing is made to go to step S108, where the encryption session key is decrypted. If the encryption session key is received by the communication portion 107 of the decryption portion 106, the decryption portion decrypts the encryption session key with the decryption key created by the key creation portion 103.

In step S109, communications using the decrypted session key are started. For example, where data stored in the data storage portion 104 is sent from the reader/writer 100 to the IC card 200, the data is read from the data storage portion 104. The data is encrypted in the encryption portion 105 using the session key as a key. The data is sent by the communication portion 107 to the IC card 200. Where data is sent in from the IC card 200, the data is received by the communication portion 107. The data is decrypted by the decryption portion 106 using the session key as a key.

In this way, in the present embodiment, at the instant when the session key is not yet exchanged, information about the capabilities of algorithms associated with encryption and decryption is sent and received. Furthermore, algorithms are selected based on the information sent and received. This permits plural algorithms to be treated. Because plural algorithms can be treated, in communications requiring a higher security level or conversely in communications permitting a lower security level, it is possible to cope with a wide scope of communications. Expansibility can be imparted to communications.

Figure 7:
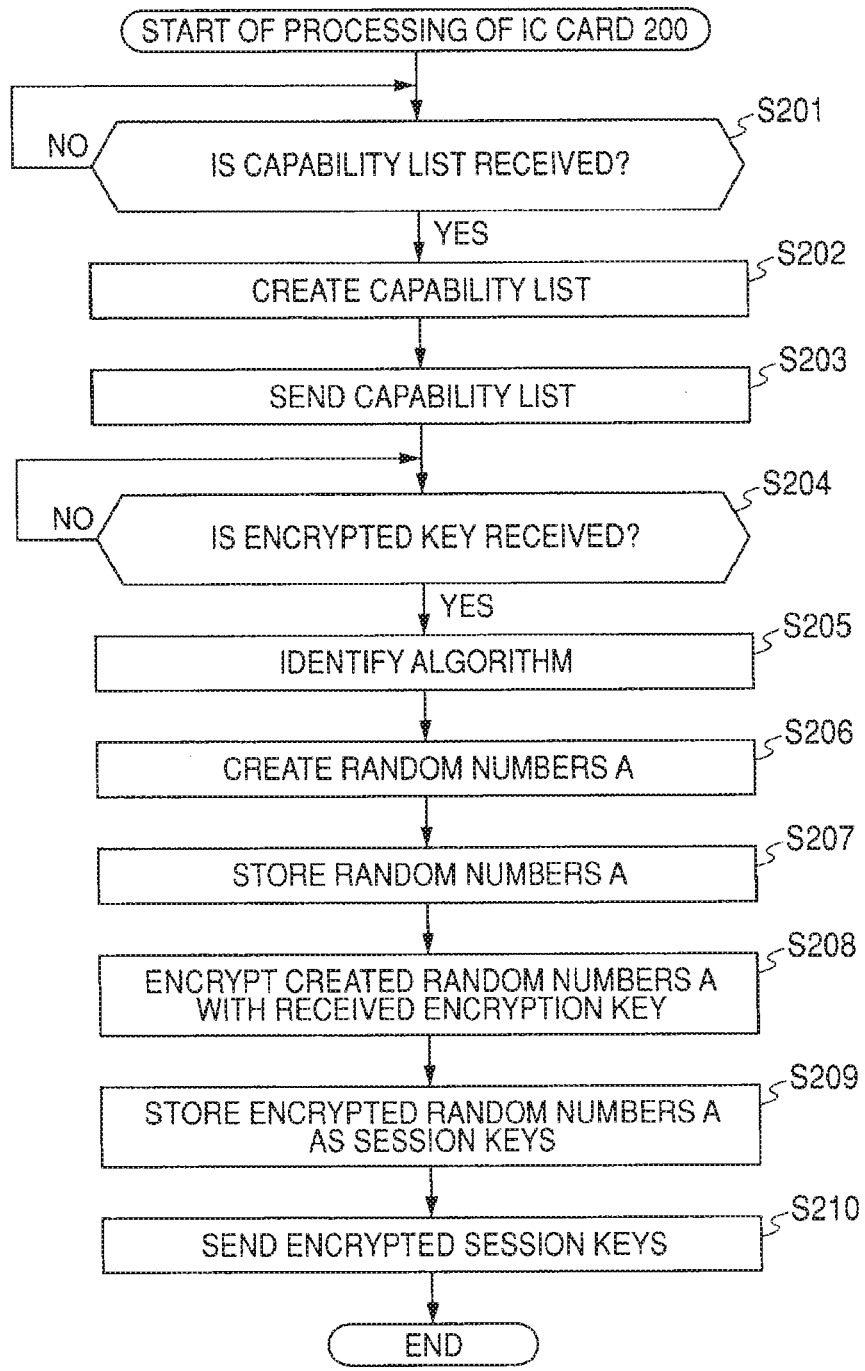
FIG. 7 is a flowchart illustrating the operation of an IC card.

The operation of the IC card 200 is next described by referring to the flowchart of FIG. 7.

In step S201, the IC card 200 makes a decision as to whether or not, it has received a capability list. The control portion 201 of the IC card 200 makes a decision as to whether the capability list from the reader/writer 100 has been received by the communication portion 207. The control portion causes the communication portion to keep waiting for reception until the control portion determines that the list is received.

Where the decision at step S201 is that the capability list from the reader/writer 100 has been received, a capability list is created in step S202. In step S203, the created capability list is sent.

Processing of the step S202 and step S203 is carried out fundamentally similarly to the processing of step S101 and step S102 executed by the reader/writer 100. That is, the IC card 200 also stores the first capability list as shown in FIG. 5 into the capability list storage portion 202. The list is sent with the second capability list as shown in FIG. 6.

When the IC card 200 sends the capability list (second capability list), the sent capability list may be a list in which all the capabilities of the IC card 200 have been described (it may be the second capability list in which all information about the first capability list stored in the capability list storage portion 202 have been reflected) or a list in which some capabilities are selectively described.

Where a capability list in which some capabilities are described is sent, the received capability list of the reader/writer 100 is referenced, for example. An algorithm coincident with the reader/writer 100 is selected. A capability list in which only the selected algorithm is described is created and sent. Where there is not any coincident algorithm, it is impossible to perform encryption or decryption with the same algorithm and so the capability list can be prevented from being sent.

Furthermore, the IC card 200 may reference the capability list of the reader/writer 100 before a capability list is created and make a decision as to whether communication with the reader/writer 100 is continued. For example, the IC card 200 may judge an algorithm satisfying a required security level from the importance of data sent and received, reference the capability list of the reader/writer 100, determine that the communication should be discontinued if it has determined that the reader/writer 100 is not a device capable of treating the algorithm satisfying the security level, and discontinue the following processing.

We return to the description of the flowchart of FIG. 7. In step S203, if a capability list is sent, the processing is made to proceed to step S204, where a decision is made as to whether or not an encryption key has been received. If the reader/writer 100 receives the capability list from the IC card 200 as mentioned previously, the reader/writer creates and sends an encryption key. A decision is made as to whether or not the sent encryption key has been received.

If the decision at step S204 is that an encryption key has been received, the processing is made to go to step S205, where an algorithm is identified. The algorithm is identified based on identification information sent in from the reader/writer 100 together with the encryption key.

In step S206, the random number creation portion 203 creates (generates) random numbers A. In step S207, the control portion 201 stores the created random numbers A, for example, into a predetermined given region of the data storage portion 204.

In this description, a case in which the identified algorithm is an algorithm generating random numbers and taking the random numbers as a session key as described below is taken as an example.

Therefore, for example, in a case where other algorithm is identified as will be described with reference to the figures subsequent to FIG. 8, processing subsequent to step S206 is carried out based on the identified algorithm and, therefore, random numbers are not always generated.

In step S208, the encryption portion 206 takes the encryption key received by the communication portion 207 as a key and encrypts the random numbers A generated by the random number creation portion 203. In step S209, the encrypted random numbers A are taken as a session key and stored, for example, into a predetermined given region within the data storage region 204.

In step S210, the encrypted random numbers A, i.e., the encrypted session key, are sent to the reader/writer 100.

In the stage preceding start of processing such as sending and reception of data, lists of algorithms regarding encryption and decryption are exchanged between devices that send and receive data in this way. Therefore, plural algorithms can be treated. The algorithms can be treated differently, for example, according to security levels. It is possible to impart expansibility to communications.

As described previously, where plural algorithms can be treated, it is necessary that the reader/writer 100 and IC card 200 may be configured to correspond to algorithms treated by themselves. In the configurations of the reader/writer 100 and IC card 200 described with reference to FIG. 2, the reader/writer 100 is configured to be capable of creating and sending an encryption key. The IC card 200 is configured to be capable of encrypting random numbers using an encryption key sent in as a key and sending the encrypted random numbers. These configurations correspond to algorithms which take the random numbers generated on the side of the IC card 200 as a session key, as described previously.

The present embodiment in a case where other algorithms are applied is next described.

Figure 8:
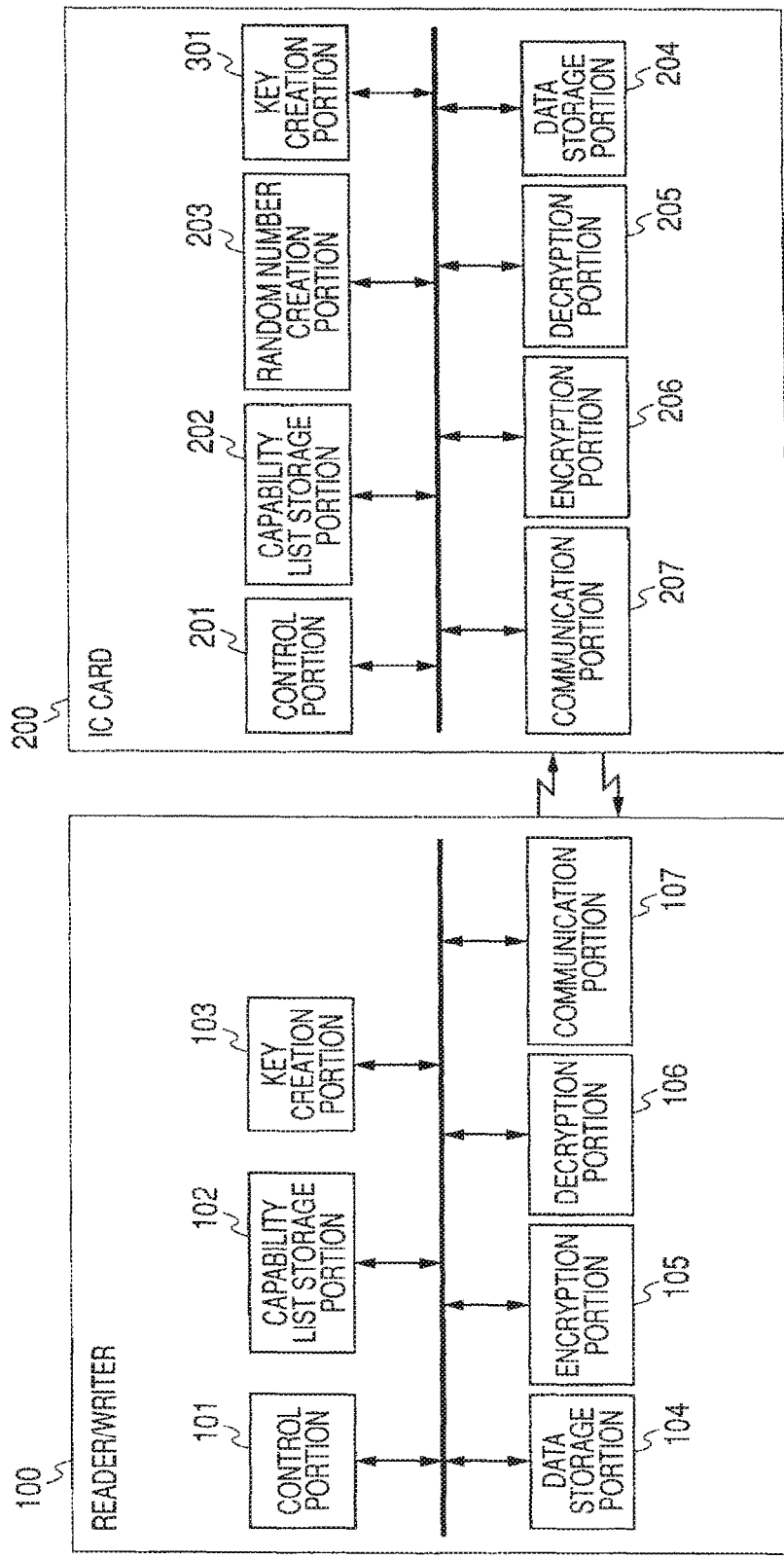
FIG. 8 is a diagram showing another example of configuration of the communication system.
Figure 9:
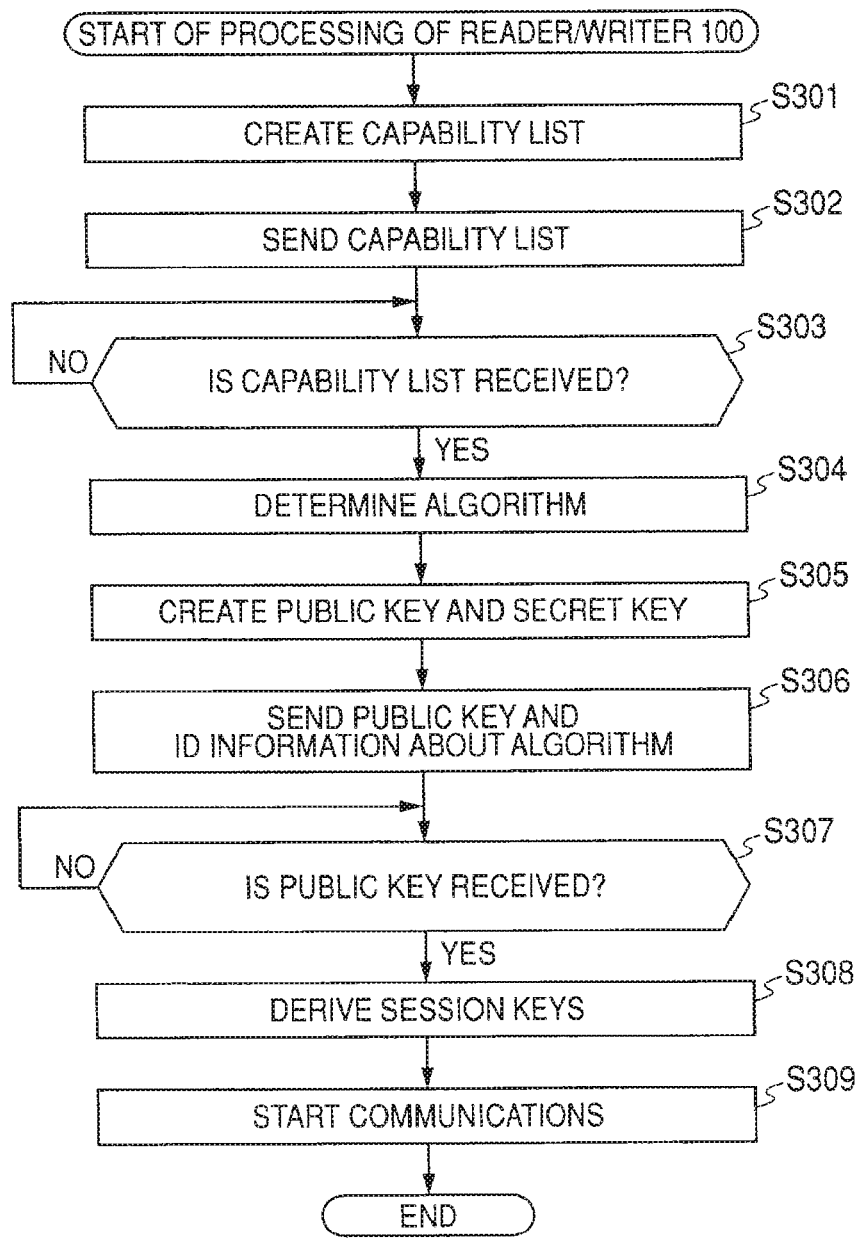
FIG. 9 is a flowchart illustrating other operation of the reader/writer.
Figure 10:
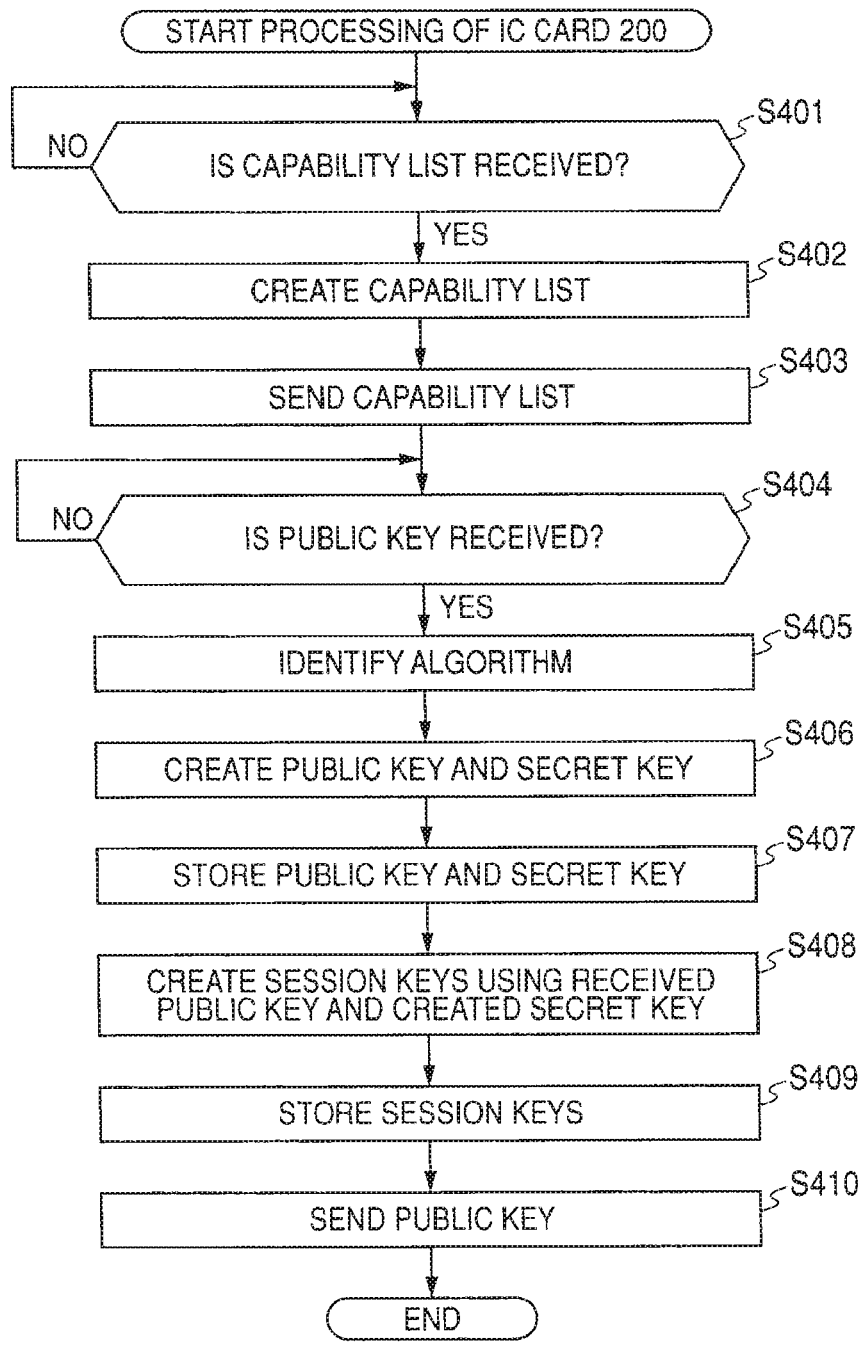
FIG. 10 is a flowchart illustrating other operation of the IC card.

The present embodiment in case where the DH (Diffie-Hellman) process is applied as an algorithm is described by referring to FIGS. 8-10.

In the DH process, it is necessary to create (hold) a public key and a secret key and so the IC card 200 is configured to be equipped with a key creation portion 301 for creating keys as shown in FIG. 8.

The communication system 50 shown in FIG. 8 is composed of reader/writer 100 and IC card 200 in the same way as the communication system 50 shown in FIG. 2. The reader/writer 100 is made similar in configuration with the reader/writer 100 shown in FIG. 2. The IC card 200 is configured to be equipped with a key creation portion 301 for creating keys. According to the configuration of the IC card 200 shown in FIG. 8, it is possible to cope with an algorithm that creates the aforementioned random numbers and takes the random numbers as a session key. It is also possible to cope with an algorithm that creates keys as described below and takes the keys as session keys.

The communication system 50 shown in FIG. 8 operates fundamentally in the same way as the case described by referring to the flowchart of FIG. 3. That is, before keys are sent and received, capability lists indicating what algorithms are used in creating keys (i.e., keys are created based on what algorithms) are exchanged, and after the exchange, creation and exchange of the keys are performed based on the algorithms.

The operations of the reader/writer 100 and IC card 200, respectively, are described below.

First, the operation of the reader/writer 100 is described by referring to the flowchart of FIG. 9. Description of the operation performed in the same way as the operation of the reader/writer 100 described with reference to the flowchart of FIG. 4 may be omitted according to circumstances.

In steps S301 and S302, capability lists are created and sent. In step S303, if a capability list from the IC card 200 is received, an algorithm or algorithms are determined in step S304.

The processing of the steps S301 to S304 is carried out similarly to steps S101 to S104 of FIG. 2. That is, processing regarding exchange of capability lists is similarly performed irrespective of algorithms used in later processing.

In step S304, an algorithm or algorithms are determined. Here, the description is continued on the assumption that the method is determined as the DH process.

In step S305, the key creation portion 103 (FIG. 8) creates a public key and a secret key based on the DH process that is the determined algorithm. To discriminate the public key and secret key created by the reader/writer 100 from the public key and secret key created by the IC card 200, the public key and secret key created by the reader/writer 100 are referred to as public key Ki and secret key Ki, respectively. The public key and secret key created by the IC card 200 are referred to as public key Kt and secret key Kt, respectively.

The key creation portion 103 creates the secret key Ki. The key creation portion 103 creates the public key Ki based on the following formula, using the created secret key Ki.

$$\text{public key } ki = g \hat{\ } \text{secret key } Ki \bmod p$$

In this formula, g and p are values referred to as domain parameters. The same value is used in both reader/writer 100 and IC card 200.

The public key Ki and secret key Ki created in this way are stored in the data storage portion 104.

In step S306, the created public key Ki and the identification information for identifying the algorithm determined in step S304 are sent to the IC card 200.

In step S308, a decision is made as to whether the public key Kt of the IC card 200 has been received from the IC card 200. The IC card 200 sends its own public key Kt in response to that the reader/writer 100 has sent the public key Ki. In step S308, a decision is made as to whether or not the public key Kt sent in has been received. The state in which the IC card is waiting for reception is maintained until reception is judged.

In step S309, the session keys from the IC card 200 are decrypted. Session keys are derived from the following equation, using the received public key Kt of the IC card 200 and the public key Ki of the reader/writer 100.

$$\text{each session key} = \text{public key } Kt \hat{\ } \text{secret key } Ki \bmod p$$

If the session keys are derived, communications using the session keys are started in step S310.

If capability lists are exchanged and algorithms are determined in this way, processing is carried out based on the algorithms. In other words, processing prior to determination of algorithms is performed commonly regardless of algorithms. After algorithms are determined, processing based on the determined algorithms is performed. Plural algorithms can be treated by exchanging information indicating what algorithms can be treated before the processing based on algorithms is performed in this way. Algorithms suitable for making communications can be selected from plural algorithms. Expansibility can be imparted to communications.

Then, the operation of the IC card 200 when the processing of the flowchart, shown in FIG. 9 is performed on the side of the reader/writer 100 is described by referring to the flowchart of FIG. 10. Processing of steps S401 to S403 is similar to the processing of steps S201 to S203 of FIG. 7. That is, in this case, too, processing performed in exchanging capability lists is performed commonly irrespective of algorithms.

In step S404, a decision is made as to whether or not the public key Ki from the reader/writer 100 has been received. If the decision at step S404 is that the public key Ki has been received, processing is made to go to step S405, where algorithms are identified. The processing of steps S404 and S405 is fundamentally similar to steps S204 and S205 of FIG. 7 except that the received key is the public key Ki.

In step S406, the key creation portion 301 of the IC card 200 creates the public key Kt and secret key Kt. If the control portion 201 receives the public key Ki and identification information for identifying algorithms by means of the communication portion 207, the control portion first identifies the algorithms from the identification information. The control portion 201 issues an instruction to the random number creation portion 203 or the key creation portion 301 according to the identified algorithm. In this case, the identified algorithm is the DH process and so an instruction is issued to the key creation portion 301 to create the public key Kt and secret key Kt based on the DH process.

The secret key Kt is first created in the key creation portion 301. Using the created secret key Kt, the public key Kt is created based on the following formula.

$$\text{public key } kt = g \hat{\ } \text{secret key } Kt \bmod p$$

The public key Kt and secret key Kt created in this way are stored in the date storage portion 204 in step S407.

In step S408, session keys are created with the received public key Ki and the created secret key Kt. The session keys are created based on the following formula in the key creation portion 301 or encryption portion 206.

$$\text{each session key} = \text{public key } ki \hat{\ } \text{secret key } Kt \bmod p$$

Where session keys are created based on the DH process, the reader/writer 100 and IC card 200 create (derive) session keys (the reader/writer 100 creates them in step S309, while the IC card 200 creates them in step S408). Because the same session keys are created (derived), the reader/writer 100 and IC card 200 share the same session keys.

In step S410, the created public key Kt is sent to the reader/writer 100. Using the public key Kt, the reader/writer 100 derives the session keys as described above.

In this way, plural algorithms can be treated. Processing according to the selected algorithm can be performed. The configurations of the reader/writer 100 and IC card 200 are not limited to the examples of configuration of FIGS. 2 and 8. Of course, structures for realizing functions required according to treated algorithms are added or deleted according to circumstances.

Figure 11:
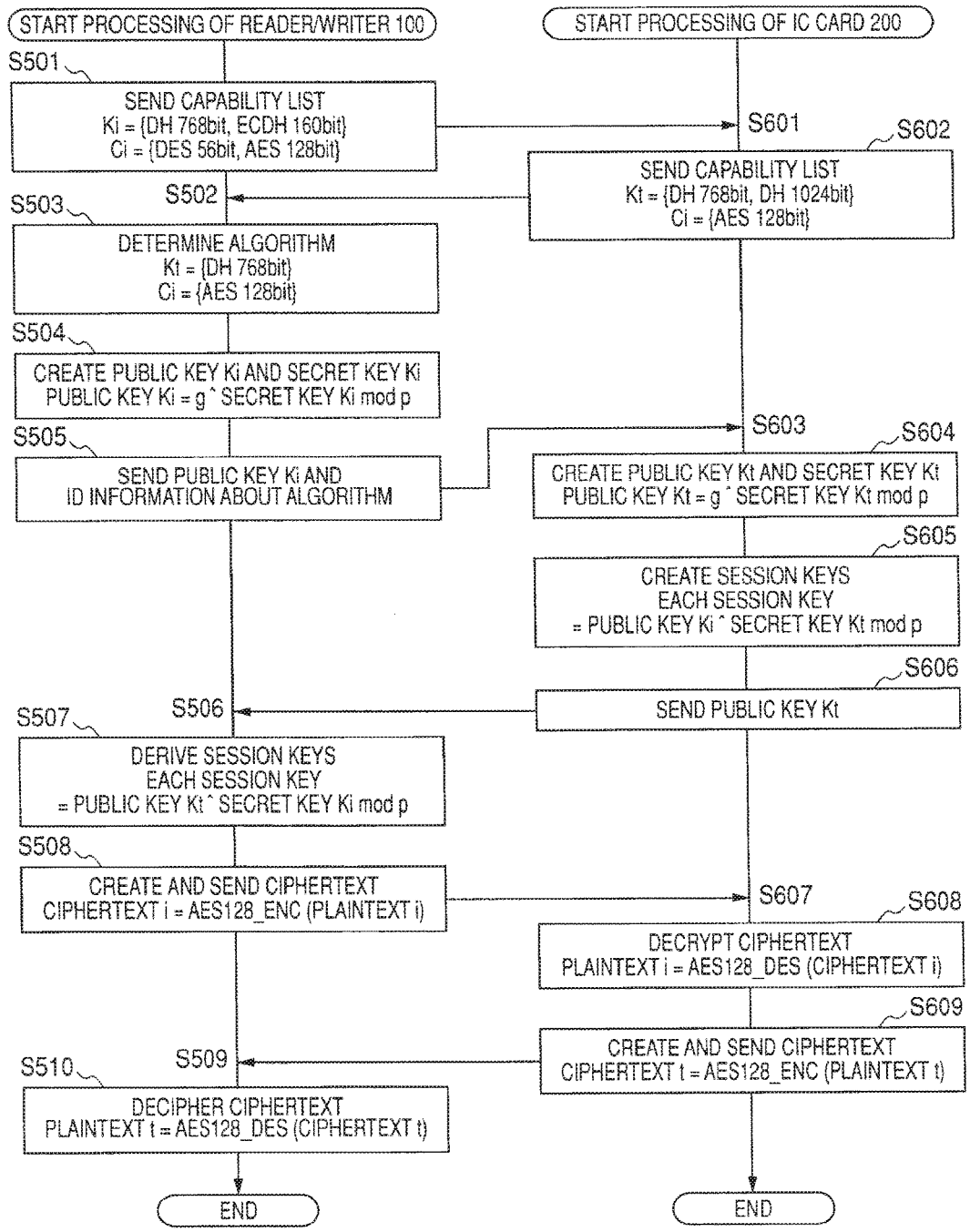
FIG. 11 is a flowchart illustrating the operation of the communication system.

Specific examples of exchanged capability lists regarding the present embodiment are cited and described by referring to the flowchart of FIG. 11.

In step S501, the reader/writer 100 creates and sends a capability list. In the following description, a case in which a capability list as shown in FIG. 12 is stored in the capability list storage portion 102 is taken as an example. In the capability list shown in FIG. 12, as the key sharing system Ki, {DH 768 bit} is described in column "K-0", and {EDch 160 bit} is described in the column "K-4", respectively. As the encryption communication system Ci, {DES 56 bit} is described in column "C-0", and {AES 128 bit} is described in column "C-4", respectively.

Such a capability list which is created by referring to a capability list as shown in FIG. 12 becomes as shown in FIG. 13, for example. That is, the sent capability list is a list in which the bits of columns "K-0" and "K-4" corresponding to two systems of {DH 768 bit} and {EDch 160 bit}, respectively, as key sharing systems Ki are set to 1. As the cryptocommunication systems Ci, the bits of columns "C-1" and "C-4" corresponding to two systems of {DES 56 bit} and {AES 128 bit}, respectively, are set to 1.

If such a capability list is sent, it is received by the IC card 200 in step S601. In step S602, the IC card 200 creates and sends a capability list. In the following description, a case in which a capability list as shown in FIG. 14 is stored in the capability list storage portion 202 is taken as an example. In the capability list shown in FIG. 14, {DH 768 bit} and {DH 1024 bit} are described as key sharing systems Kt in columns "K-0" and "K-1", respectively. {AES 128 bit} is described as the cryptocommunication system Ct in column "C-4".

Such a capability list created by referring to a capability list as shown in FIG. 14 is as shown in FIG. 15. That is, the sent capability list is a list in which the bits of columns "K-0" and "K-1" corresponding to two key sharing systems Kt {DH 768 bit} and {DH 1024 bit}, respectively, are set to 1, and the bits of column "C-4" corresponding to a single system {AES 128 bit} as the cryptocommunication system Ct are set to 1.

If such a capability list is sent, it is received by the reader/writer 100 in step S502. In step S503, the reader/writer determines an algorithm. As for the key sharing system K, in this case, the reader/writer 100 corresponds to two systems {DH 768 bit, EDch 160 bit}. The IC card 200 corresponds to a single system {DH 68 bit, DH 1024 bit} with two different security levels. Therefore, the common system {DH 768 bit} is selected.

In this case, as for the cryptocommunication system C, the reader/writer 100 corresponds to two systems of {DES 56 bit, AES 123 bit}, and the IC card 200 corresponds to one system of {AES 128 bit}. Therefore, the common system {AES 128 bit} is selected.

As a result, the key sharing system K={DH 768 bit} is selected as an algorithm and the cryptocommunication system C={AES 128 bit} is selected.

In step S504, the reader/writer 100 creates the public key Ki and secret key Ki. In this case, because the DH process is selected as a key sharing system, the secret key Ki is created. Using the created secret key Ki, the public key Ki is created based on the following formula.

public key $ki = g\hat{\ }$secret key $Ki \bmod p$

In step S505, the public key Ki and the identification information about the algorithm are sent. In this case, as for the identification information about the algorithm, information stating that key sharing system K={DH 768 bit} and cryptocommunication system C={AES 128 bit} is information that can be identified on the side of the IC card 200.

If such public key Ki and identification information are sent, they are received by the IC card 200 in step S603. In step S604, the public key Kt and secret key Kt are created. In this case, it is identified from the identification information that the algorithm is the DH process and that the key length is 768 bits. Therefore, the public key Kt and secret key Kt based on the DH process are created.

If the secret key Kt is created in the IC card 200, the created secret key Kt is used, and the public key Kt is created based on the following formula.

public key $kt = g\hat{\ }$secret key $Kt \bmod p$

In step S605, session keys are created. Each session key is created based on the following formula from the received public key Ki and created secret key Kt.

each session key=public key $Ki\hat{\ }$secret key $Kt \bmod p$

In step S606, the created public key Kt is sent to the reader/writer 100.

In step S506, if the reader/writer 100 receives the public key Kt from the IC card 200, session keys are derived in step S507. Each session key is derived by the following formula.

each session key=public key $Kt\hat{\ }$secret key $Ki \bmod p$

If the session keys are derived, a cryptocommunication in which the derived session keys are utilized for packet encryption is performed. In this case, cryptocommunications in which the session keys are utilized for encryption of {AES 128 bit} are carried out.

That is, in step S508, data (plaintext i) sent to the IC card 200 is encrypted by an AES type encryption method using the session keys as keys. Ciphertext i is created and sent.

ciphertext $i = AES128\_ENC(\text{plaintext } i)$

If the sent ciphertext i is received by the IC card 200 in step S607, the ciphertext is decrypted in step S608. That is, in this case, the IC card 200 recognizes that the received ciphertext i has been encrypted by the AES method. Therefore, the IC card decrypts the received ciphertext i by the AES method using the session keys, thus obtaining plaintext i.

plaintext $i = AES128\_DES(\text{ciphertext } i)$

The IC card 200 that has obtained the plaintext i in this way encrypts the data and sends the data to the reader/writer 100 as the need arises. Here, in step S609, it is assumed that the IC card 200 encrypts plaintext t by the AES method, creates ciphertext t, and sends it.

ciphertext $t = AES128\_ENC(\text{plaintext } t)$

If the sent ciphertext t is received by the reader/writer 100 in step S509, the ciphertext is decrypted in step S510. That is, in this case, the reader/writer 100 recognizes that the received ciphertext t has been encrypted by the AES method and so the received ciphertext t is decrypted by the AES method using the session keys, thus obtaining plaintext t.

plaintext $t = AES128\_DES(\text{ciphertext } t)$

In this way, reception and sending of data is repeated the required number of times.

In the above-described embodiment, an algorithm is determined on the side of the reader/writer 100. It may also be determined on the side of the IC card 200.

Processing associated with exchange of capability lists in the aforementioned embodiment may be performed at any timing as long as the processing is performed in a stage when the algorithm is not yet determined. For example, when the side of the reader/writer 100 issues a polling request, a capability list may be sent as the polling request.

Furthermore, for example, the side of the reader/writer 100 may issue a polling request. A capability list may be sent at the instant when the IC card 200 responds to the polling request.

Moreover, in the description of the above embodiment, a capability list is sent from the side of the reader/writer 100 and then a capability list is sent from the side of the IC card 200. A capability list may be sent first from the IC card 200. For example, the side of the IC card 200 receives a polling request from the reader/writer 100, and the IC card 200 sends a capability list in response to the request. The reader/writer 100 sends a capability list in response to the list.

In the description of the above embodiment, the reader/writer 100 and IC card 200 send their respective capability lists. It is also possible that only one of them sends a capability list to the other. For example, the reader/writer 100 may send a capability list to the IC card 200. The IC card 200 may refer to the capability list originating form the reader/writer 100, select a desired algorithm, and send identification information about the selected algorithm to the reader/writer 100. The IC card 200 may not transmit the capability list of the IC card 200.

Alternatively, for example, the IC card 200 may send a capability list to the reader/writer 100, the reader/writer 100 reference the capability list originating from the IC card 200, select a desired algorithm, and send identification information about the selected algorithm to the IC card 200. The reader/writer 100 may not transmit the capability list of the reader/writer 100.

In other words, one may send a capability list to the other. The other receiving the capability list may determine a utilized algorithm and send identification information about the determined algorithm to the one. Thus, capability lists are not exchanged between them.

According to the present invention, plural (more than 1) algorithms used for encryption and decryption when data is sent and received can be handled. Appropriate algorithms can be selected and used from the plural algorithms according to the importance of the data received and sent. Therefore, for example, communications from a low security level to a high security level can be performed such that the communications can cope with required security levels. Expansibility can be imparted to the communications.

The words "information processor" and "device" referred to herein correspond to devices or apparatus which are an initiator and a target, for example, in the NFCIP-1 standard. That is, the initiator and target correspond to a device that produces an RF field and starts NFCIP-1 communications and a device that responds to an instruction from the initiator by utilizing load modulation or modulation of the RF field produced by the device itself, respectively. In addition, each of these devices or apparatus may be a communication device equipped with one or more IC chips each having a different function, the communication device being a device having other functions or the like.

In the description of the above-described embodiment, the reader/writer 100 is taken as an example of the initiator, and the IC card 200 is taken as an example of the target. The present invention is not limited in application to only the reader/writer 100 and IC card 200. For example, the present invention can be applied to a device that sends and receives data. The invention can also be applied to a device that performs communications wirelessly when data is sent and received. The invention can also be applied to a device that performs communications via cables.

[With Respect to Recording Medium]

The aforementioned sequence of processing operations or steps can be executed by hardware or software. Where the aforementioned sequence of processing steps is carried out by software, a program constituting the software is executed by the CPU 105 or CPU 207 of FIG. 2. The program is read in from a recording medium that can be read by the reader/writer 100 (300) or IC card 200 (400).

In the present specification, the steps that perform the above-described sequence of processing steps are carried out in the described order in a time-sequential manner, of course. The steps are not always processed in a time-sequential manner. They may also be carried out in parallel or individually.

The invention claimed is:

1. A first device for communication with a second device, comprising:
   circuitry configured to:
   send, to the second device, a capability list indicating capabilities regarding a plurality of encryption algorithms used by the first device;
   determine an encryption algorithm of the plurality of encryption algorithms based on a security level that corresponds to an importance of data sent or received in the communication;
   receive, from the second device, identification information and a first key; and
   create a session key based on the first key and the identification information,
      wherein the identification information corresponds to the determined encryption algorithm.

2. The first device according to claim 1, wherein the circuitry is further configured to:
   encrypt, after the reception of the identification information, the session key based on the first key; and
   send the encrypted session key to the second device.

3. The first device according to claim 1, wherein the capabilities include capabilities of a key sharing system and a cryptocommunication system.

4. The first device according to claim 3, wherein the key sharing system is defined by at least one of Diffie-Hellman, Elliptic Curve Diffie-Hellman, Rivest, Shamir, Adleman (RSA), or a pre-shared key, and the cryptocommunication system is defined by at least one of Data Encryption Standard (DES) or Advanced Encryption Standard (AES).

5. The first device according to claim 1, wherein the encryption algorithm has a priority based on difficulty to decipher the data encrypted by the encryption algorithm.

6. A method of information processing for a first device communicating with a second device, comprising:
   sending, to the second device, a capability list indicating capabilities regarding a plurality of encryption algorithms used by the first device;
   determining an encryption algorithm of the plurality of encryption algorithms based on a security level corresponding to an importance of data sent or received in the communication;
   receiving, from the second device, identification information and a first key; and
   creating a session key based on the first key and the identification information,
      wherein the identification information corresponds to the determined encryption algorithm.

7. The method of information processing according to claim 6, further comprising:
   encrypting, after the reception of the identification information, the session key based on the first key; and
   sending the encrypted session key to the second device.

8. The method of information processing according to claim 6, wherein the capabilities include capabilities of a key sharing system and a cryptocommunication system.

9. The method of information processing according to claim 8, wherein the key sharing system is defined by at least one of Diffie-Hellman, Elliptic Curve Diffie-Hellman, Rivest, Shamir, Adleman (RSA), or a pre-shared key, and the cryptocommunication system is defined by at least one of Data Encryption Standard (DES) or Advanced Encryption Standard (AES).

10. The method of information processing according to claim 6, wherein the encryption algorithm has a priority based on difficulty to decipher the data encrypted by the encryption algorithm.

11. A non-transitory computer-readable medium having stored thereon, computer-executable instructions that when executed by a first device, cause the first device to execute operations, the operations comprising:

sending, to a second device, a capability list indicating capabilities regarding a plurality of encryption algorithms used by the first device;

determining an encryption algorithm of the plurality of encryption algorithms based on a security level corresponding to an importance of data sent or received in a communication between the first device and the second device;

receiving, from the second device, identification information and a first key; and creating a session key based on the first key and the identification information, wherein the identification information corresponds to the determined encryption algorithm.

12. The non-transitory computer-readable medium according to claim 11, wherein the operations further comprising:

encrypting, after the reception of the identification information, the session key based on the first key; and sending the encrypted session key to the second device.

13. The non-transitory computer-readable medium according to claim 11, wherein the capabilities include capabilities of a key sharing system and a cryptocommunication system.

14. The non-transitory computer-readable medium according to claim 13, wherein the key sharing system is defined by at least one of Diffie-Hellman, Elliptic Curve Diffie-Hellman, Rivest, Shamir, Adleman (RSA), or a pre-shared key, and the cryptocommunication system is defined by at least one of Data Encryption Standard (DES) or Advanced Encryption Standard (AES).

15. The non-transitory computer-readable medium according to claim 11, wherein the encryption algorithm has a priority based on difficulty to decipher the data encrypted by the encryption algorithm.

* * * * *